United States Patent
Pouchelon et al.

(12) 
(10) Patent No.: US 8,333,867 B2
(45) Date of Patent: Dec. 18, 2012

(54) METHOD FOR BONDING FIBROUS SILICONE-COATED SUPPORTS

(75) Inventors: Alain Pouchelon, Meyzieu (FR); Maryline Quemin, Lyons (FR); Laurent Dumont, Messimy (FR); Francis Lafaysse, Saint Genis-Laval (FR)

(73) Assignee: Bluestar Silicones France SAS, Lyons (FR)

( * ) Notice: Subject to any disclaimer, the term of this patent is extended or adjusted under 35 U.S.C. 154(b) by 867 days.

(21) Appl. No.: 10/555,700

(22) PCT Filed: May 5, 2004

(86) PCT No.: PCT/FR2004/001075
§ 371 (c)(1), (2), (4) Date: Mar. 23, 2007

(87) PCT Pub. No.: WO2004/101696
PCT Pub. Date: Nov. 25, 2004

(65) Prior Publication Data
US 2007/0261790 A1    Nov. 15, 2007

(30) Foreign Application Priority Data
May 7, 2003   (FR) ..................... 03 05556

(51) Int. Cl.
*C04B 37/00* (2006.01)

(52) U.S. Cl. ....................................................... 156/325
(58) Field of Classification Search ................... 156/325
See application file for complete search history.

(56) References Cited

U.S. PATENT DOCUMENTS

| | | | |
|---|---|---|---|
| 4,569,870 A |   | 2/1986 | Shinmi |
| 4,766,193 A | * | 8/1988 | Nakasuji et al. ................ 528/17 |
| 4,889,576 A |   | 12/1989 | Suganuma et al. |
| 5,279,894 A |   | 1/1994 | Hoffman et al. |
| 6,562,180 B1 |   | 5/2003 | Bohin et al. |
| 2002/0129898 A1 | * | 9/2002 | Takuman et al. ............. 156/329 |

FOREIGN PATENT DOCUMENTS

| | | |
|---|---|---|
| EP | 0 131 854 A1 | 1/1985 |
| EP | 1 225 211 A2 | 7/2002 |
| WO | 99/43753 | 9/1999 |

* cited by examiner

*Primary Examiner* — Michael Orlando
(74) *Attorney, Agent, or Firm* — SNR Denton US LLP

(57) ABSTRACT

The invention relates to a process for the adhesive bonding of fibrous supports using a silicone elastomer which is thermosetted by radical crosslinking using at least one peroxide. The silicone elastomer is inserted between the supports over at least a portion of the region of overlap of the supports, where the supports are held in contact in the region of overlap in an manner that prevents trapping of air at the interface between the supports. The supports containing the silicone elastomer are heated while in intimate contact to allow the adhesive bonding of the supports by crosslinking of the adhesive.

23 Claims, No Drawings

METHOD FOR BONDING FIBROUS SILICONE-COATED SUPPORTS

CROSS-REFERENCE TO RELATED APPLICATIONS

This application is the national stage entry of PCT/FR04/01075, filed of May 5, 2004, which claims priority to French application FR03 05556, filed May 7, 2003

FIELD OF THE INVENTION

The invention relates to the adhesive bonding of fibrous materials, in particular of flexible supports.

The invention relates to the adhesive bonding of fibrous materials, in particular of flexible supports, such as woven supports or nonwoven supports, comprising at least one silicone coating obtained by application of a coat on or by impregnation of at least one of their faces using at least one silicone composition, liquid at the time of this operation (in particular such as RTV2 or dilutions of LSR or HCE) which can be crosslinked to give an elastomer. Varnishes (silicones or copolymers) can be applied to such coatings.

BACKGROUND OF THE INVENTION

The flexible supports concerned are chosen in particular from textile cloths optionally coated with a layer of silicone elastomer, the antisoil varnish optionally being applied to the layer of silicone elastomer, such cloths being capable of being used for the manufacture:
  1. of architectural textiles (components of textile architecture);
  2. or else of flexible supports other than architectural textiles.

As regards the field of application 1., it should be specified that, throughout the present account and within the meaning of the present invention, the term "architectural textile" is understood to mean a woven fabric or nonwoven fabric and more generally any fibrous support intended, after coating, for the preparation:
  of shelters, of mobile structures, of textile constructions, of partitions, of flexible doors, of tarpaulins, of tents, of stands or of marquees;
  of furniture, of cladding, of advertising displays, of windbreaks or of filter panels;
  of solar protection devices, of ceilings and of blinds.

As regards the field of application 2., it will be indicated that these flexible supports other than architectural textiles can, for example, be those intended for the manufacture of in particular:
  airbags used for the protection of the occupants of a vehicle,
  glass braids (woven glass sheaths for thermal and dielectric protection for electrical wires),
  conveyor belts, fire barrier fabrics or thermal insulation fabrics,
  clothes,
  compensators (flexible sealing sleeves for pipework).

The application of a silicone coat is defined as the action of applying a coat to a fibrous support, in particular a textile, using a crosslinkable liquid silicone composition and in then bringing about the crosslinking of the film applied to the support, so as to produce a coating intended in particular to protect it, to confer specific qualities on it, for example to confer hydrophobicity/oleophobicity or impermeabilization characteristics on it or improved mechanical properties on it, or even capable of modifying the appearance thereof.

For its part, the impregnation is defined as the action of bringing about the penetration of a very fluid liquid based on crosslinkable silicone inside a fibrous support (penetration to the core) and in then bringing about the crosslinking of the silicone in order to confer, on the support, properties of the type of those mentioned above.

In practice, the composites obtained by application of a coat or by impregnation of silicone elastomers on textile supports exhibit numerous advantages related to the intrinsic characteristics of silicones, namely, in particular, good flexibility, good mechanical strength and improved behavior towards fire. Furthermore, unlike conventional elastomers, silicones confer on them, inter alia, appropriate protection due to their hydrophobicity and to their excellent resistance to attacks by chemicals, heat and the weather, and great longevity.

However, in the field of textile architecture, which constitutes an important outlet for the abovesaid composites, the main players sometimes draw up other requirements, which are in particular the following:
  resistance to soiling substances,
  good characteristics with regard to appearance, especially with respect to the coloring and the gloss,
  ability to adhesively bond, to make it possible to easily assemble the composites two by two,
  low sliding coefficient in order to favor the handling of the composite,
  good cohesion of the composite.

These properties can be introduced by an appropriate surface coating, a varnish (for example a silicone varnish), which would advantageously:
  be able to be easily spread over a silicone layer, indeed even a nonsilicone layer (for example poly(vinyl chloride), polyurethane or polyamide),
  adhere perfectly to this silicone or nonsilicone layer,
  and more generally be easy and economical to employ industrially.

Apart from the question of the coatings and varnishes of these silicone composites for textile architecture, it is often necessary to combine together various parts or components of these composites, in order to strengthen them locally (reinforcements) or in order to join parts to one another for the purpose of increasing the surface area of them or of carrying out the preparation of the final article.

This operation is often carried out by sewing, which produces a suitable combined product but which, all the same, results in certain disadvantages. This is because the needle holes are so many holes in the composites which can be harmful to their leaktightness properties and to their resistance to attacks by chemicals, heat and the weather. The corresponding final design may also be limited thereby.

Another way of proceeding is adhesive bonding. However, it is difficult to find adhesives which are sufficiently strong to achieve the required performances.

Thus, patent EP-B-0 219 075 and its corresponding U.S. Pat. No. 4,889,576 reveal that silicone-coated textiles can be adhesively bonded using strips of silicone rubbers, such as Heat Curable Elastomers (HCE), which are positioned between the two parts of composites to be combined together. They are adhesive strips which are plastic (nonliquid) at ambient temperature (Williams plasticity of between 170 and 600, e.g. 280). The presentation of the silicone adhesive in this form poses a problem as it to a certain extent renders the processing awkward with in particular the need for curing of the adhesive during a compression-heating phase where both the pressure applied and the temperature are high. Moreover, this presentation involves a specific preparation, the cost of which is not insignificant.

The HCE gum used as adhesive is, for example, of the $M^{Vi}D$-$D^{Vi}M^{Vi}$ type; with the following definition of the siloxy units, M: $(CH_3)_3SiO_{1/2}$, $M^{Vi}$: $(CH_3)_2ViSiO_{1/2}$, D: $(CH_3)_2SiO_{2/2}$, $D^{Vi}$: $(CH_3)ViSiO_{2/2}$, Vi=vinyl. This gum composition also comprises a radical catalyst for curing/crosslinking: 2,4-dichlorobenzoyl peroxide, and a silica filler treated with HexaMethylDisilaZane. This crosslinkable gum is used to produce adhesive strips by molding and cutting. These strips subsequently have to be placed in the region of overlap of the composite parts to be combined together. Pressurization (2 kg/5 cm) and heating (180° C.-10 min) are subsequently involved. It is clear that all these handling operations are not propitious to the optimization of the industrial costs. The tensile yield strength measured for the combined products with peroxide HCEs according to these patents is of the order of 200 N/3 cm.

The nomenclature adopted in the present account to define the siloxy units is as follows:

M: $(R°)_3SiO_{1/2}$,
$M^{Vi}$: $(R°)_2(Vi)SiO_{1/2}$,
D: $(R°)_2SiO_{2/2}$,
$D^{Vi}$: $(R°)(Vi)SiO_{2/2}$,
M': $(R°)_2(H)SiO_{1/2}$,
D': $(R°)(H)SiO_{2/2}$,
$M^{OH}$: $(R°)_2(OH)SiO_{1/2}$,
$D^{OH}$: $(R°)(OH)SiO_{2/2}$,
T: $(R°)SiO_{3/2}$,
Q: $SiO_{4/2}$,
R° is chosen from linear or branched alkyl groups having from 1 to 8 carbon atoms inclusive (e.g., methyl, ethyl, isopropyl, tert-butyl and n-hexyl) which are optionally substituted by at least one halogen atom (e.g., 3,3,3-trifluoropropyl), from aryl groups (e.g., phenyl), and from $C_2$-$C_4$ alkenyl radicals (e.g., vinyls),
Vi=vinyl; this alkenyl can be replaced by any appropriate alkenyl group.

In view of this prior art, one of the essential objects of the present invention is to provide an improved process for combining together fiber/silicone composite parts using a silicone elastomer, which process has to be economical and relatively inexpensive to carry out.

Another essential object of the present invention is to provide an improved process for combining together, using a silicone elastomer, textiles or nonwoven fabrics having a coat of and/or impregnated with silicone, which process has to result in a combined product which is particularly resistant to tensile stress, for example having a peel strength of greater than or equal to 80 N/5 cm.

Another essential object of the present invention is to provide a novel high performance silicone adhesive for combining together fiber/silicone composite parts.

These objects, among others, have been achieved by the inventors, who have discovered, entirely surprisingly and unexpectedly, that it is entirely appropriate to select, as adhesive for textiles or nonwoven fabrics having a coat of and/or impregnated with silicone elastomer, another silicone elastomer which can be crosslinked under hot conditions by the radical route using peroxides and which has a rheology such that this adhesive with a liquid (nonplastic) nature can be deposited on the composites to be combined together, this being achieved with a sufficient and uniform thickness, in order to better control the level of the adhesion developed. Thus, this adhesive is directly deposited "in place" and cured thermally, in order to easily and economically obtain a high performance combined product.

BRIEF SUMMARY OF THE INVENTION

The present invention thus relates, first, to a process for the adhesive bonding of woven or nonwoven fibrous supports comprising at least one silicone coating, this process being of the type of those consisting in causing the supports to be adhesively bonded to overlap one another, a silicone-based adhesive being inserted between the supports over at least a portion of the region of overlap;

characterized in that it consists essentially in:
employing at least one crosslinkable silicone adhesive of the class of the Liquid Silicone Rubbers (LSR) or of the class of the Pumpable Silicone Elastomers (PSE) which exists in the liquid (fluid paste) form at ambient temperature and which has the following rheological characteristics:
limit of fluidity:
Brookfield viscosity at 25° C. in Pa·s:

$\eta \geq 100$, preferably $\eta \geq 200$ extrusion rate:
extrusion rate Er in g·min$^{-1}$, measured according to a test Et defined in the description:

Er≦50, preferably Er≦0;

directly forming and deploying this liquid adhesive on at least one of the supports to be adhesively bonded, in their region of overlap;

holding the adhesive-coated supports in intimate contact in their region of overlap, so as to prevent any trapping of air at the interface;

and then heating the adhesive in place between the supports thus held in intimate contact, so as to make possible the adhesive bonding of the supports by crosslinking of the adhesive.

DETAILED DESCRIPTION OF THE INVENTION

In accordance with the invention, the extrusion test Et is carried out using an extrusion gun designed to receive cartridges with a volume of 200 ml. For the test, the cartridge comprises 100 to 150 g of completely degassed product to be extruded. The cartridge is equipped with a hollow extrusion needle with a diameter of 0.3 mm. The extrusion pressure applied is 6.2 bar at 25° C. The amount extruded over 6 s is measured. 3 measurements are carried out for each sample and the mean is taken. The result is expressed in g·min$^{-1}$.

This process, which is simple and economical to carry out, involves silicone adhesives which are liquid at ambient temperature and which have in particular the characteristic of being able to be directly formed and deployed on the supports to be adhesively bonded.

The silicones concerned are, inter alia:
silicone elastomers of the class of the Liquid Silicone Rubbers (LSR) thermosetting by crosslinking (or crosslinkable) by polyaddition of ≡SiH/≡Si-alkenyl units in the presence of a metal catalyst (preferably a platinum catalyst) and of single-component or two-component (preferably two-component) type, the Brookfield viscosity at 25° C. in Pa·s of these LSRs advantageously being between 100 and 500, preferably between 200 and 500;
Pumpable Silicone Elastomers (PSE) thermosetting by radical crosslinking involving ≡Si-alkenyl units using at least one peroxide and of single-component type;
these PSEs being particularly preferred.

Preferably, the silicone adhesive selected has the following composition:
(a) at least one polyorganosiloxane (POS) exhibiting, per molecule, at least two alkenyl groups, preferably $C_2$-$C_6$ alkenyl groups, bonded to silicon;
(b) a reinforcing inorganic filler,
(c) a catalytically effective amount of at least one catalyst:
based on at least one organic peroxide, in the case where the composition is devoid of POS crosslinking agent (e) defined below;
or based on at least one metal compound, preferably a platinum compound, advantageously in combination with a setting regulator, in the case where the composition comprises at least one POS crosslinking agent (e) defined below;
(d) optionally an additional filler;
(e) optionally at least one polyorganosiloxane crosslinking agent exhibiting, per molecule, at least three hydrogen atoms bonded to silicon;
(f) optionally at least one polyorganosiloxane additive in which at least 50% by number of the silicon atoms are directly bonded each to at least one hydrogen atom;
(g) optionally at least one adhesion promoter;
(h) optionally at least one polyorganosiloxane resin;
(i) and optionally functional additives for conferring specific properties.

According to a preferred but nonlimiting embodiment of the process according to the invention, the silicone adhesive which is liquid at ambient temperature which is favored is formed by at least one Pumpable Silicone Elastomer (PSE) thermosetting by radical crosslinking using at least one peroxide.

The predominant POS of the adhesive, namely the polyorganosiloxane (a), exhibits units of formula:

in which:
W is an alkenyl group,
Z is a monovalent hydrocarbon group which has no unfavorable effect on the activity of the catalyst and which is chosen from alkyl groups having from 1 to 8 carbon atoms inclusive which are optionally substituted by at least one halogen atom and from aryl groups,
a is 1 or 2, b is 0, 1 or 2 and a+b is between 1 and 3,
at least a portion of the units (a.1) being M units (a+b=3);
and at least a portion of the other units are units of mean formula:

in which Z has the same meaning as above and c has a value of between 0 and 3.

These polyorganosiloxane polymers (a) are advantageously linear polymers, the diorganopolysiloxane chain of which is composed essentially of units of formula $Z_2SiO$ (D siloxy units). This chain is blocked at each end by a unit of formula $Z_3Si_{0.5}$ (M siloxy units) and/or a radical of formula OZ'. In these formulae:
the Z symbols, which are identical or different, represent monovalent hydrocarbon radicals, such as alkyl radicals, for example methyl, ethyl, propyl, octyl, octadecyl, and the like, aryl radicals, for example phenyl, tolyl, xylyl, and the like, aralkyl radicals, such as benzyl, phenylethyl, and the like, cycloalkyl and cycloalkenyl radicals, such as cyclohexyl, cycloheptyl or cyclohexenyl radicals, and the like, alkenyl radicals, for example vinyl or allyl radicals, and the like, alkaryl radicals, cyanoalkyl radicals, such as a cyanoethyl radical, and the like, or haloalkyl, haloalkenyl and haloaryl radicals, such as chloromethyl, 3,3,3-trifluoropropyl, chlorophenyl, dibromophenyl or trifluoromethylphenyl radicals,
the R' symbol represents a hydrogen atom, an alkyl radical having from 1 to 4 carbon atoms or the β-methoxyethyl radical.

Preferably, at least 60% of the Z groups represent methyl radicals. The presence, along the diorganopolysiloxane chain, of small amounts of units other than $Z_2SiO$, for example of units of formula $ZSiO_{1.5}$ (T siloxy units) and/or $SiO_2$ (Q siloxy units), is not, however, ruled out in the proportion of at most 2% (these percentages expressing the number of the T and/or Q units per 100 silicon atoms).

Mention may be made, as concrete examples of units of formulae $Z_2SiO$ and $Z_3SiO_{0.5}$ and of radicals of formula OZ', of those of formulae:

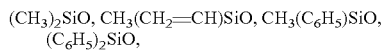

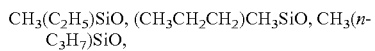

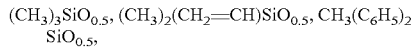

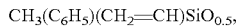

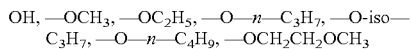

These POS oils are sold by silicone manufacturers or can be manufactured by employing techniques already known.

The reinforcing filler b) is selected from silicas and/or aluminas, preferably from silicas.

The target, as silicas which can be used, is fillers characterized by a fine particle size often of less than or equal to 0.1 μm and a high ratio of the specific surface to the weight, generally within the range from approximately 50 square meters per gram to more than 300 square meters per gram. The silicas of this type are commercially available products and are well known in the art of the manufacture of silicone rubbers. These silicas can be colloidal silicas, silicas prepared by the pyrogenic route ("fumed" silicas) or by wet processes (precipitated silicas), or mixtures of these silicas.

The chemical nature and the process for the preparation of these silicas capable of forming the filler (b) are not important for the purposes of the present invention, provided that the silica is capable of exerting a reinforcing effect in the finished elastomeric adhesive. Of course, blendings of different silicas can also be used.

These silica powders exhibit a mean particle size generally in the region of or less than 0.1 μm and a BET specific surface of greater than 50 m²/g, preferably of between 50 and 400 m²/g, in particular between 150 and 350 m²/g.

These silicas are optionally:
pretreated using at least one compatibilizing agent chosen from the group of the molecules which satisfy at least two criteria:
exhibits a strong interaction with the silica, at the level of its hydrogen bonds with itself, and with the surrounding silicone oil;
is itself, or its decomposition products, easily discharged from the final mixture by heating under vacuum or under a gas stream, and compounds of low molecular weight are thus preferred;
and/or treated in situ:
specifically using at least one untreated silica, and/or, additionally, by using at least one compatibilizing agent similar in nature to that which can be used in pretreatment and as defined above.

The term "in situ treatment of the siliceous filler" is understood to mean bringing together the filler and the compatibilizing agent in the presence of at least a portion of the predominant POS silicone polymer (a) targeted above. In a particularly preferred way, this consists essentially in introducing the compatibilizing agent (CA) into the preparation medium in two steps:

first, before and/or substantially simultaneously with the operation in which at least a portion of the silicone oil employed is brought into contact with at least a portion of the siliceous filler used, this introduction of CA (portion 1) being carried out all at once or in several lots and corresponding to a proportion of less than or equal to 8%, preferably of less than or equal to 5% and more preferably still of less than or equal to 3%, as dry weight, with respect to the total filler;

and, secondly (portion 2), after this operation in which silicone oil and filler are brought into contact.

More specifically, the method can consist:
mixing:
100 parts by weight of silicone oil,
0 to 5 parts by weight of water,
20 to 80 parts by weight of filler composed of silica,
1 to 20 parts by weight of compatibilizing agent,
in leaving to react, preferably with stirring,
in heating the mixture obtained, a pressure/temperature pair being chosen such that devolatilization of at least a portion of the water and of the volatile components occurs,
in cooling the mixture, if necessary.

The mixing operation is carried out at standard temperature and at standard pressure and preferably under an inert atmosphere ($N_2$). Furthermore, it is advisable, under these conditions, for the silicone oil and the water, but also the compatibilizing agent, to be in the liquid form in order to facilitate the mixing.

The compatibilizing agent is chosen according to the treatment method (pretreatment or in situ); it can, for example, be selected from the group consisting of:
chlorosilanes,
polyorganocyclosiloxanes, such as octamethylcyclosiloxane (D4),
silazanes, preferably disilazanes, or their mixtures, hexamethyldisilazane (HMDZ) being the preferred silazane and being able to be used in combination with divinyltetramethyldisilazane,
polyorganosiloxanes exhibiting, per molecule, one or more hydroxyl groups bonded to silicon,
amines, such as ammonia or alkylamines of low molecular weight, such as diethylamine,
organic acids of low molecular weight, such as formic acid or acetic acid,
and their mixtures.

In the case of the in situ treatment, the compatibilizing agent is preferably employed in the presence of water.

For further details in this respect, reference may be made, for example, to patent FR-B-2 764 894.

In an alternative form, use may be made of the compatibilizing methods of the prior art providing an early treatment with the silazane (e.g., FR-A-2 320 324) or a late treatment (e.g., EP-A-462 032) while knowing, however, that, depending on the silicas used, their use will generally not make it possible to obtain the best results in terms of mechanical properties, in particular elongatability, obtained with a two-stage treatment in accordance with the invention.

Use is advantageously made, as reinforcing alumina which can be used as filler (b), of a highly dispersible alumina doped or nondoped in a known way. Of course, blendings of different aluminas can also be useful. Mention will be made, as nonlimiting examples of such aluminas, of the aluminas A 125, CR 125 and D 65CR from Baïkowski. Preferably, the reinforcing filler used is a fumed silica, taken alone or as a mixture with alumina.

With regard to the loading, it is preferable to employ an amount of reinforcing filler (b) of between 5 and 30% by weight, preferably between 7 and 20% by weight, with respect to the combined constituents of the composition.

The use of an additional filler (d), preferably a nonreinforcing filler, can be envisaged in accordance with the invention. Mention may in particular be made, among the nonreinforcing additional fillers (d), of those selected from the group consisting of:
colloidal silicas, fumed and precipitated silica powders, diatomaceous earths, ground quartz, carbon black, titanium dioxide, aluminum oxide, hydrated alumina, expanded vermiculite, zirconia, a zirconate, unexpanded vermiculite, calcium carbonate, zinc oxide, mica, talc, iron oxide, barium sulfate, slaked lime and their mixtures.

These additional fillers (d) have a particle size generally of between 0.1 and 300 μm and a BET surface of less than 100 $m^2/g$.

In the case where the adhesive comprises at least one PSE, the catalyst (c) is an organic peroxide which can be any of those which act as curing agents with regard to compositions which form silicone elastomers. It can thus be any one of the peroxides or peresters which it is known to employ with silicone elastomers, for example di(tert-butyl) peroxide, benzoyl peroxide, tert-butyl peracetate, dicumyl peroxide, 2,5-dimethylhexane 2,5-diperbenzoate and 2,5-bis(t-butylperoxy)-2,5-dimethylhexane.

In the case of the adhesive bonding according to the invention, use will advantageously be made of a peroxide which is active in the absence of pressure exerted, for example monochlorobenzoyl peroxide or 2,4-dichlorobenzoyl peroxide.

The alternative form according to which an LSR is present in the adhesive of the process according to the invention underlies a polyaddition reaction which is well known to a person skilled in the art. The catalyst (c) recommended can be chosen in particular from platinum and rhodium compounds. Use may in particular be made of the complexes of platinum and of an organic product disclosed in U.S. Pat. No. 3,159,601, U.S. Pat. No. 3,159,602 and U.S. Pat. No. 3,220,972 and European patents EP-A-0 057 459, EP-A-0 188 978 and EP-A-0 190 530 and the complexes of platinum and of vinylated organosilanes disclosed in U.S. Pat. No. 3,419,593, U.S. Pat. No. 3,715,334, U.S. Pat. No. 3,377,432 and U.S. Pat. No. 3,814,730. The catalyst generally preferred is platinum. In this case, the amount by weight of catalyst (c), calculated as weight of platinum metal, is generally between 2 and 400 ppm, preferably between 5 and 100 ppm, based on the total weight of the polyorganosiloxanes (a): ≡Si-alkenyl (preferably ≡Si-vinyle) and (e) and/or (f): ≡SiH.

As regards specifically the optional polyorganosiloxanes (e) or (f), they are preferably those comprising the siloxyl unit of formula:

$$H_d L_e SiO_{(4-(g+h))/2} \tag{ef.1}$$

in which:
L is a monovalent hydrocarbon group which has no unfavorable effect on the activity of the catalyst and which is chosen from alkyl groups having from 1 to 8 carbon atoms inclusive (optionally substituted by at least one halogen atom), advantageously from the methyl, ethyl, propyl and 3,3,3-trifluoropropyl groups, and from aryl groups, advantageously from the xylyl, tolyl and phenyl radicals, d is 1 or 2, g is 0, 1 or 2 and g+h has a value of between 1 and 3;

at least a portion of the other units optionally being units of mean formula:

 (ef.2)

in which L has the same meaning as above and i has a value of between 0 and 3.

The conditions specific to (e): at least 3≡SiH units per molecule: at least 50% by number of (e) to (f) units, furthermore apply.

The dynamic viscosity of this polyorganosiloxane (e) or (f) is at least equal to 10 mPa·s and it is preferably between 20 and 1000 mPa·s.

The polyorganosiloxane (e) or (f) can be formed solely of units of formula (ef.1) or can additionally comprise units of formula (ef.2).

The polyorganosiloxane (e) or (f) can exhibit a linear, branched, cyclic or network structure.

The L group has the same meaning as the above Z group.

Examples of units of formula (ef.1) are:

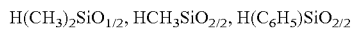

The examples of D siloxyl units of formula $SiO_{4/2}$ are: dimethylsiloxyl, methylphenylsiloxyl, diphenylsiloxyl, methylsiloxyl and phenylsiloxyl.

Examples of polyorganosiloxanes (e) are linear and cyclic compounds, such as:

dimethylpolysiloxanes with hydrodimethylsilyl ends, copolymers with (dimethyl)(hydromethyl)polysiloxane units with trimethylsilyl ends, copolymers with (dimethyl)(hydromethyl)polysiloxane units with hydrodimethylsilyl ends, hydromethylpolysiloxanes with trimethylsilyl ends, cyclic hydromethylpolysiloxanes.

The setting regulators generally used in combination with the metal catalyst (e.g. platinum) in the LSRs are well known retardants for the addition reaction (crosslinking inhibitor). They are conventionally chosen from the following compounds:

polyorganosiloxanes, advantageously cyclic polyorganopolysiloxanes, which are substituted by at least one alkenyl, tetramethylvinyltetrasiloxane being particularly preferred, pyridine, organic phosphines and phosphites, unsaturated amides, alkylated maleates, and acetylenic alcohols.

These acetylenic alcohols (cf. FR-B-1 528 464 and FR-A-2 372 874), which are among the preferred thermal blockers for the hydrosilylation reaction, have the formula:

in which formula:
R is a linear or branched alkyl radical or a phenyl radical;
R' is H or a linear or branched alkyl radical or a phenyl radical;
it being possible for the R and R' radicals and the carbon atom situated α to the triple bond optionally to form a ring;
the total number of carbon atoms present in R and R' being at least 5, preferably from 9 to 20.

Said alcohols are preferably chosen from those exhibiting a boiling point of greater than 250° C. Mention may be made, by way of examples, of:

1-ethynyl-1-cyclohexanol;
3-methyl-1-dodecyn-3-ol;
3,7,11-trimethyl-1-dodecyn-3-ol;
1,1-diphenyl-2-propyn-1-ol;
3-ethyl-6-ethyl-1-nonyn-3-ol;
3-methyl-1-pentadecyn-3-ol.

These α-acetylenic alcohols are commercially available.

Such a regulator is present in a proportion of 3000 ppm at most, preferably in a proportion of 100 to 2000 ppm, with respect to the total weight of the organopoly-siloxanes (a) and (e), indeed even (f).

In an advantageous embodiment of the process according to the invention, use may be made of an adhesion promoter (g). This adhesion promoter (g) can, for example, comprise:

(g.1) at least one alkoxylated organosilane corresponding to the following general formula:

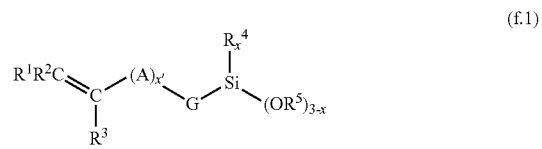 (f.1)

in which:
$R^1$, $R^2$, $R^3$ are hydrogen or hydrocarbon radicals which are identical to or different from one another and which represent hydrogen, a linear or branched $C_1$-$C_4$ alkyl or a phenyl optionally substituted by at least one $C_1$-$C_3$ alkyl;
A is a linear or branched $C_1$-$C_4$ alkylene;
G is a valency bond;
$R^4$ and $R^5$ are identical or different radicals and represent a linear or branched $C_1$-$C_4$ alkyl;
x'=0 or 1
x=0 to 2,
said compound (g.1) preferably being vinyltrimethoxysilane (VTMS);

(g.2) at least one organosilicon compound comprising at least one epoxy radical, said compound (g.2) preferably being 3-glycidoxypropyl-trimethoxysilane (GLYMO);

(g.3) at least one metal M chelate and/or one metal alkoxide of general formula $M(OJ)_n$, with n=valency of M and J=linear or branched $C_1$-$C_8$ alkyl, M being chosen from the group formed by: Ti, Zr, Ge, Li, Mn, Fe, Al and Mg, said compound (g.3) preferably being tert-butyl titanate.

The proportions of (g.1), (g.2) and (g.3), expressed as % by weight with respect to the total of the three, are preferably as follows:

(g.1)≧10, (g.2)≧10, (g.3)≦80.

Furthermore, this adhesion promoter (g) is preferably present in a proportion of 0.1 to 10% by weight, preferably 0.5 to 5% by weight and more preferably still 1 to 25% by weight, with respect to the combined constituents of the composition.

According to one alternative form, the silicone phase of the composition comprises at least one polyorganosiloxane resin (h) optionally comprising at least one alkenyl residue in its structure and this resin exhibits a content by weight of alkenyl group(s) of between 0.1 and 20% by weight and preferably between 0.2 and 10% by weight.

These resins are well known and commercially available branched organopolysiloxane oligomers or polymers. They are preferably provided in the form of siloxane solutions. They comprise, in their structure, at least two different units chosen from the M, D, T and Q units, at least one of these units being a T or Q unit.

Preferably, these resins are alkenylated (vinylated). Mention may be made, as examples of branched organopolysiloxane oligomers or polymers, of MQ resins, MDQ resins, TD resins and MDT resins, it being possible for the alkenyl functional groups to be carried by the M, D and/or T units. Mention may be made, as examples of resins which are particularly well suited, of vinylated MQ or MDQ resins having a content by weight of vinyl groups of between 0.2 and 10% by weight, these vinyl groups being carried by the M and/or D units.

This structural resin is advantageously present in a concentration of between 10 and 70% by weight with respect to the combined constituents of the composition, preferably between 30 and 60% by weight and more preferably still between 40 and 60% by weight.

As regards the functional additives (i) commonly used in the field of heat curable polyorganosiloxane compositions and thus capable of being employed, they can in particular be:
- at least one "antistructuring" product i1);
- and/or at least one polysiloxane resin i2);
- and/or at least one stabilizing agent i3);
- and/or at least one coupling agent i4);
- and/or at least one covering product, such as, for example, a pigment/dye or a stabilizing agent i5);
- and/or at least one boron-based compound i6).

According to an advantageous form of the process according to the invention, the forming and the deploying in a direct fashion of the liquid adhesive on at least one of the supports to be adhesively bonded in their region of overlap is an essentially manual operation optionally carried out using at least one tool, preferably an extrusion tool and more preferably still of the type consisting of a manual extrusion gun with a cartridge having an appropriate nozzle.

The operation in which the adhesive-coated supports are brought into intimate contact in their region of overlap and the heating are carried out, for example, using at least one tool chosen from the group consisting of: a clamp, a bar and a roller; said tool being equipped with at least one heating device comprising, for example, one or more electrical resistance elements.

The fibrous supports more especially envisaged in accordance with the invention are chosen from the group of materials consisting of: glass, silica, metals, ceramic, silicon carbide, carbon, boron, natural fibers, such as cotton, wool, hemp or flax, artificial fibers, such as viscose, cellulose fibers and synthetic fibers (preferably polyesters, polyamides, polyacrylics, chlorinated polymers, polyolefins, synthetic rubbers, poly(vinyl alcohol), aramids, fluoropolymers or phenolic polymers).

The composition for applying a coat on fibrous supports to be adhesively bonded is advantageously selected from those which can be cured at room temperature (RTV) comprising:
(1) at least one polyorganosiloxane exhibiting, per molecule, at least two $C_2$-$C_6$ alkenyl groups bonded to silicon,
(2) at least one polyorganosiloxane exhibiting, per molecule, at least two hydrogen atoms bonded to silicon,
(3) a catalytically effective amount of at least one catalyst composed of at least one metal belonging to the platinum group,
(4) a ternary adhesion promoter consisting of:
(4.1) at least one alkoxylated organosilane comprising, per molecule, at least one $C_3$-$C_6$ alkenyl group,
(4.2) at least one organosilicon compound comprising at least one epoxy radical,
(4.3) at least one metal M chelate and/or one metal alkoxide of general formula: $M(OJ)_n$, with n=valency of M and J=linear or branched $C_1$-$C_8$ alkyl,
M being chosen from the group formed by: Ti, Zr, Ge, Li, Mn, Fe, Al and Mg,
(5) a reinforcing siliceous filler treated in situ with a compatibilizing agent in the presence of polyorganosiloxane (1),
(6) a polyorganosiloxane described as extender and exhibiting end siloxyl units with hydrofunctional groups,
(7) optionally a neutralizing agent,
(8) optionally a crosslinking inhibitor and/or other additive(s) used in compositions of this type,
(9) and optionally expanded or expandable hollow inorganic microspherical fillers.

As regards the varnishes capable of being applied to the adhesive-coated fibrous supports according to the invention, they can be silicone varnishes, for example those which can be crosslinked by the cationic and/or radical route, such as those disclosed in application PCT WO 00/59992, or silane varnishes based on mixtures of essentially unsaturated silanes.

According to another of its aspects, the present invention relates to a novel adhesive selected from silicones which are liquid at ambient temperature and which exhibit the following rheological characteristics:
limit of fluidity:
Brookfield viscosity at 25° C. in Pa·s:

$\eta \geq 100$; preferably $\eta \geq 200$ extrusion rate:
extrusion rate Er in g·min$^{-1}$, measured according to a test Et defined in the description:

Er$\leq$50; preferably Er$\leq$20;

with the following composition:
(a) at least one polyorganosiloxane (POS) exhibiting, per molecule, at least two alkenyl groups, preferably $C_2$-$C_6$ alkenyl groups, bonded to silicon;
(b) a reinforcing inorganic filler,
(c) a catalytically effective amount of at least one catalyst:
based on at least one organic peroxide, in the case where the composition is devoid of POS crosslinking agent (e) defined below;
or based on at least one metal compound, preferably a platinum compound, advantageously in combination with a setting regulator, in the case where the composition comprises at least one POS crosslinking agent (e) defined below;
(d) optionally an additional filler;
(e) optionally at least one polyorganosiloxane crosslinking agent exhibiting, per molecule, at least three hydrogen atoms bonded to silicon;
(f) optionally at least one polyorganosiloxane additive in which at least 50% by number of the silicon atoms are directly bonded each to at least one hydrogen atom;
(g) optionally at least one adhesion promoter;

(h) optionally at least one polyorganosiloxane resin;
(i) and optionally functional additives for conferring specific properties.

The adhesive is preferably chosen from Pumpable Silicone Elastomers (PSE), taken by themselves alone or as a mixture with one another, thermosetting by radical crosslinking using at least one peroxide.

This adhesive is intended to be used for the adhesive bonding of textiles or nonwoven fabrics having a coat of and/or impregnated with silicone.

The following examples make possible a better understanding of the invention through the description of tests of adhesive bonding of fabrics having a coat of silicone in accordance with the process according to the invention and adhesive compositions employed.

EXAMPLES

—1— Preparation of the Adhesive

The adhesive is a heat curable silicone elastomer of the class of the Pumpable Silicone Elastomers (PSE) or of the LSR (Liquid Silicone Rubber) elastomers commonly available commercially today. LSRs are distinguished from PSEs by their principle of crosslinking and by their viscosity.

PSEs are elastomers with a composition similar to those of Heat Curable Elastomers but with a much lower consistency; nevertheless, like the latter, they remain crosslinkable by the peroxide route.

Examples of such compositions are given below:
—1.1— Description of the Reference HCE
The following are mixed in a laboratory arm mixer:
   100 parts by weight of an $MDD^{Vi}M$ silicone copolymer gum (a1) which assays 700 ppm by weight of vinyl groups distributed randomly along the silicone chain;
   7 parts by weight of an $MDD^{Vi}M$ silicone copolymer gum (a2) which assays 2.2% by weight of vinyl groups distributed randomly along the silicone chain;
   0.1 part by weight of methacryloyloxypropyltrimethoxysilane (adhesion promoter (f));
   0.9 part by weight of a polydimethylsiloxane with dimethylhydroxy ends with a viscosity of 50 mPa·s (compatibilizing agent for the silica (b));
   30 parts by weight of a fumed silica (b) with a specific surface of 200 $m^2/g$ treated with siloxane.

The highly homogeneous mixture is then taken up on a roll mill for the purpose of its catalysis according to the formulation:
   100 parts by weight of the preceding mixture;
   1.2 parts of 2,5-dimethyl-2,5-di(tert-butylperoxy)hexane (catalyst (c)).

—1.2— Outline of the Preparation of the PSEs Employed in the Adhesive Bonding According to the Invention The basis for the preparation of the PSEs used in the adhesive bonding according to the invention is an LSR I from Rhodia® Silicones, which is a standard composition crosslinkable by ≡SiH/≡SiVi addition.

It is presented in two parts A and B, to be combined at the time of use.

The properties of the resulting elastomer are typically:
   Shore A hardness=50
   tensile strength=8.5 MPa
   elongation at break=550%
   tear strength=40 kN/m Taken separately, these two parts cannot crosslink since not all the components necessary for the addition reaction are present. On the other hand, it is possible to add peroxide to them; each of the parts then behaves as a peroxide elastomer; their fluidity categorizes them in the range of the Pumpable Silicone Elastomers.

The following mixtures are thus prepared using a centrifugal mixer:
   LSR I.A/B with a hardness of 50:
      100 parts of LSR I.A, comprises the Pt catalyst (inactive if A is used alone) but not SiH
      100 parts of LSR I.B, comprises the SiH crosslinking agent
   PSE 1:
      100 parts of LSR I A
      0.6 part of 2,5-dimethyl-2,5-di(tert-butylperoxy)hexane
   PSE 2:
      100 parts of LSR I B
      0.6 part of 2,5-dimethyl-2,5-di(tert-butylperoxy)hexane
   PSE 3:
      100 parts of LSR I B
      1.2 parts of 2,4-dichlorobenzoyl peroxide —2— Use The PSEs of the invention are deposited in place by extrusion in the form of a flat ribbon. The second silicone-coated textile web is then applied by covering the first over the adhesive.

By way of comparison, the reference HCE is formed into a strip by calendering, followed by cutting up the sheet thus formed. The ribbon of adhesive is then inserted between the two textile webs to be adhesively bonded.

The layer of adhesive sandwiched between the textiles is then placed in a system capable of raising its temperature to a level and according to a period of time sufficient to provide for the crosslinking thereof.

The heating system is a clamp which makes it possible to heat and press the combined product at the level of the adhesive bonding.

The pressure applied is adjusted according to the consistency of the layer of adhesive. By way of indication, the pressure applied in the case of the HCE is 100 $N/cm^2$.

The test specimens prepared are thus composed of:
   a first strip of a textile web having a coat of silicone elastomer,
   a layer of adhesive,
   a second strip of the textile web having a coat of silicone elastomer.

The adhesive is applied only over half of the length of the complex.

In the tests which follow, the supports tested are formed by an application of a coat composed of a coated textile is a polyester web coated, using a doctor blade, with a silicone elastomer SE as described below (colored gray/without impregnation). The elastomer layer thus adjusted to approximately 200 $g/m^2$ is crosslinked in 10 min at 150° C.

Preparation of SE:
40 kg of an α,ω-divinylated silicone oil with a viscosity of 1.5 Pa·s, which assays 0.1 meq of vinyl (Vi) per gram of oil, 0.24 kg of drinking water and 0.24 kg of hexamethyldisilazane are introduced into 100 l arm mixer. After homogenizing, 13.9 kg of a fumed silica characterized by its specific surface of 200 $m^2/g$ are added portionwise in about 2 hours. After mixing for approximately 1 hour, 2.27 kg of hexamethyldisilazane are added in about 1 hour. 2 hours later, a heating phase is begun, during which the mixture is placed under a stream of nitrogen (30 $m^3/h$); the heating continues until a temperature of approximately 140° C. is reached, which stationary temperature is maintained for 2 hours in order to discharge the volatile materials from the composition.

The suspension is then allowed to cool.
Starting from this suspension, a part A' and a part B' are formulated in appropriate reactors.
The part A' comprises:
320 g of the suspension,
111 g of an α,ω-divinylated oil with a viscosity of 100 Pa·s which assays 0.03 meq of Vi per gram of oil,
35 g of ground quartz with a mean particle size (d50) of approximately 2.5 μm,
12 g of a polyhydro oil with a viscosity of 0.3 Pa·s which assays 1.6 meq of SiH per gram of oil,
12 g of an α,ω-dihydro oil which assays 1.9 meq of SiH per gram of oil,
5 g of γ-methacryloyloxypropyltrimethoxysilane,
5 g of γ-glycidoxypropyltrimethoxysilane,
0.7 g of ethynylcyclohexanol.
The part B' comprises:
480 g of the suspension,
20 g of butyl orthotitanate,
1.1 g of a Karstedt catalyst comprising a platinum content of 10%.
The parts A' and B' are mixed in the ratio of 100 to 10 and, after debubbling.

—3— Operating Conditions

In a first step, the standard operating conditions used for the combined products with HCE are applied (P=1-1.5 T/t=3 min/T=180° C.).
In a second step, the crosslinking time is varied and, for the peroxide 2,4-DCB, the crosslinking temperature is varied.
All the combined products are tested in the weft direction (the least favorable direction for the adhesive bonding). The combined product produced is tested in a "180° peel" geometry. The test specimen described above measures 5 cm in width. Each of the ends of the complex facing each other is taken in the jaws of a tensile testing device for the purpose of measuring the peel strength. Pulling is carried out at 50 mm/min.
For this type of fabric, the differences in peel strength between the weft direction and the warp direction are reduced (cf. LAF tests with HCE adhesive: F=150N in the weft direction and F=185N in the warp direction).
Results
They are presented in table 1 below.

TABLE 1

| Adhesive | Application of coat | Conditions P (T) | t (min) | T (° C.) | Adhesive thickness (mm) | Peel strength (N/cm) | Site Of Failure |
|---|---|---|---|---|---|---|---|
| Reference HCE | | 1 | 3 | 180 | 0.8 | 90 | |
| LSR I A/B | | 1 | 3 | 180 | 0.2 | 40 | |
| PSE 1 | | 1 | 3 | 180 | Very low | 17 | |
| PSE 2 | | 1 | 3 | 180 | Very low | 50 | |
| | | 1 | 3 | 180 | 1.1 | 30 | Interfacial |
| | | 1.5 | 10 | 180 | 1.1 | 100 | Interfacial |
| PSE 3 | | 1.5 | 3 | 120 | 1.2 | 20 | In the adhesive |
| | | 1.5 | 3 | 120 | 1.2 | 5 | Interfacial |
| | | 1.5 | 10 | 120 | 1.1 | 10 | In the adhesive |

DISCUSSION

In comparison with the reference HCE, the PSE and LSR are rendered notably easier to use and their performance is comparable.

PSE 2 proves to be the most effective.

Good adhesive bondings can also be obtained at relatively low temperature (120° C.) in the case of the peroxide 2,4-DCB: PSE 3.

What is claimed is:

1. A process for the adhesive bonding of woven or nonwoven fibrous supports comprising at least one silicone coating together, wherein the supports to be adhesively bonded comprise a region in which the supports overlap one another; said process comprising:
   (a) providing at least one crosslinkable silicone adhesive comprising silicone elastomers thermosettable by radical crosslinking employing at least one peroxide, wherein said silicone adhesive exists in the liquid (fluid paste) form at ambient temperature and has the following rheological characteristics:
      (i) limit of fluidity:
   Brookfield viscosity at 25° C. in Pa·s:

$\eta \geq 100$;

(ii) extrusion rate:
   extrusion rate Er in g·min$^{-1}$, measured according to a test Et defined in the description:

$Er \leq 50$;

(b) deploying the liquid adhesive on at least one of the woven or nonwoven fibrous supports to be adhesively bonded, in their region of overlap;
   (c) holding the adhesive-coated supports in intimate contact in their region of overlap, so as to prevent any trapping of air at the interface; and
   (d) then heating the adhesive in place between the supports thus held in intimate contact, so as to crosslink the adhesive by radical crosslinking to form a cured adhesive which connects said supports.

2. The process as claimed in claim 1, wherein the silicone adhesive which is liquid at ambient temperature has the following composition:
   (a) at least one polyorganosiloxane (POS) comprises per molecule, at least two alkenyl groups bonded to silicon;
   (b) a reinforcing inorganic filler,
   (c) a catalytically effective amount of at least one catalyst for cross-linking the POS, wherein the catalyst is:
      (i) based on at least one organic peroxide, when the composition is devoid of POS crosslinking agent (e) defined below; or
      (ii) based on at least one metal compound, when the composition comprises at least one POS crosslinking agent (e) defined below;
   (d) optionally, an additional filler;

(e) optionally, at least one polyorganosiloxane crosslinking agent having, per molecule, at least three hydrogen atoms bonded to silicon;
(f) optionally, at least one polyorganosiloxane additive in which at least 50% by number of the silicon atoms are directly bonded each to at least one hydrogen atom;
(g) optionally, at least one adhesion promoter;
(h) optionally, at least one polyorganosiloxane resin; and
(i) optionally, functional additives for conferring specific properties.

3. The process as claimed in claim 2, wherein the polyorganosiloxane (a) comprises units of formula:

$$W_a Z_b SiO_{(4-(a+b))/2} \quad (a.1)$$

in which:
W is an alkenyl group,
Z is a monovalent hydrocarbon group which has no unfavorable effect on the activity of the catalyst and which is selected from the group consisting of: (a) alkyl groups having from 1 to 8 carbon atoms inclusive which are optionally substituted by at least one halogen atom, and (b) aryl groups,
a is 1 or 2, b is 0, 1 or 2 and a+b is from 1 to 3 inclusive, at least a portion of the units (a.1) being M units (a+b=3);
and at least a portion of the other units being units of mean formula:

$$Z_c SiO_{(4-c)/2} \quad (a.2)$$

in which Z has the same meaning as above and c has a value of from 0 to 3 inclusive.

4. The process as claimed in claim 2, wherein the filler (b) is selected from silicas with a specific surface of between 100 and 300 m²/g, these silicas optionally being:
(a) pretreated using at least one compatibilizing agent chosen from the group of the molecules which satisfy at least two criteria:
  (i) exhibits a strong interaction with the silica, at the level of its hydrogen bonds with itself, and with the surrounding silicone oil;
  (ii) is itself, or its decomposition products, removable from the final mixture by heating under vacuum or under a gas stream;
and/or
(b) treated in situ:
  (i) using at least one untreated silica, and/or
  (ii) by using at least one compatibilizing agent which satisfy the two criteria (a) (i) and (ii) listed above.

5. The process as claimed in claim 2, wherein the additional filler (d) is selected from the group consisting of: colloidal silicas, fumed and precipitated silica powders, diatomaceous earths, ground quartz, carbon black, titanium dioxide, aluminum oxide, hydrated alumina, expanded vermiculite, zirconia, a zirconate, unexpanded vermiculite, calcium carbonate, zinc oxide, mica, talc, iron oxide, barium sulfate, slaked lime and their mixtures.

6. The process as claimed in claim 2, wherein the polyorganosiloxane crosslinking agent (e) or the polyorganosiloxane additive (f) comprises the siloxyl unit of formula:

$$H_d L_e SiO_{(4-(g+h))/2} \quad (ef.1)$$

in which:
L is a monovalent hydrocarbon group which has no unfavorable effect on the activity of the catalyst and which is selected from the group consisting of: (a) alkyl groups having from 1 to 8 carbon atoms inclusive (optionally substituted by at least one halogen atom), and (b) aryl groups,
d is 1 or 2, g is 0, 1 or 2 and g+h has a value of from 1 to 3 inclusive;
at least a portion of the other units optionally being units of mean formula:

$$L_g SiO_{(4-i)/2} \quad (ef.2)$$

in which L has the same meaning as above and i has a value of from 0 to 3 inclusive;
wherein (e) has at least 3 =SiH units per molecule and at least 50% by number of (e) to (f) units.

7. The process as claimed in claim 2, wherein the inorganic filler (d) is selected from the group consisting of reinforcing and nonreinforcing siliceous and nonsiliceous materials.

8. The process as claimed in claim 1, wherein the step of deploying the liquid adhesive on at least one of the supports to be adhesively bonded in their region of overlap comprises an essentially manual operation optionally carried out using at least one tool.

9. The process as claimed in claim 1, wherein the operation in which the adhesive-coated supports are brought into intimate contact in their region of overlap and the heating are carried out using at least one tool selected from the group consisting of: a clamp, a bar and a roller; said tool being equipped with at least one heating device.

10. The process as claimed in claim 1, wherein the fibrous support is selected from the group of materials consisting of: glass, silica, metals, ceramic, silicon carbide, carbon, boron, natural fibers, including cotton, wool, hemp and flax, artificial fibers, including viscose, cellulose fibers and synthetic fibers.

11. The process as claimed in claim 1, wherein $\eta \geq 200$ and $Er \leq 20$.

12. The process as claimed in claim 6, wherein L is selected from the group consisting of: (a) the alkyl groups methyl, ethyl, propyl and 3,3,3-trifluoropropyl; and (b) the aryl groups xylyl, tolyl and phenyl.

13. The process as claimed in claim 7, wherein the reinforcing and nonreinforcing siliceous and nonsiliceous materials are selected from the group consisting of colloidal silicas, fumed and precipitated silica powders, diatomaceous earths, ground quartz, carbon black, titanium dioxide, aluminum oxide, hydrated alumina, expanded vermiculite, zirconia, a zirconate, unexpanded vermiculite, calcium carbonate, zinc oxide, mica, talc, iron oxide, barium sulfate, slaked lime and their mixtures.

14. The process as claimed in claim 10, wherein the synthetic fibers are polyesters, polyamides, polyacrylics, chlorinated polymers, polyolefins, synthetic rubbers, poly(vinyl alcohol), aramids, fluoropolymers or phenolic polymers.

15. The process as claimed in claim 2, wherein the at least two alkenyl groups in the at least one polyorganosiloxane (POS) comprise $C_2$-$C_6$ alkenyl groups.

16. The process as claimed in claim 2, wherein the catalyst comprises a platinum compound.

17. The process as claimed in claim 2, wherein the catalyst comprises a platinum compound in combination with a setting regulator.

18. The process as claimed in claim 8, wherein the tool is an extrusion tool.

19. The process as claimed in claim 8, wherein the tool is a manual extrusion gun with a cartridge having an appropriate nozzle.

20. The process of claim 1, wherein the cured adhesive has a Shore A hardness of 50.

21. The process of claim 1, wherein the cured adhesive has a tensile strength of 8.5 MPa.

22. The process of claim 1, wherein the cured adhesive has a Shore A hardness of 50 and a tensile strength of 8.5 MPa.

23. The process of claim 1, wherein the step of heating the adhesive in place between the supports thus held in intimate contact is conducted at a temperature of at 120° C., 150° C. or 180° C.

* * * * *